United States Patent [19]
Gerok

[11] 4,154,587
[45] May 15, 1979

[54] GAS FILTER ELEMENT AND METHOD OF MANUFACTURING THE SAME

[75] Inventor: Hans Gerok, Oberrohrdorf, Switzerland

[73] Assignee: Luwa AG, Zurich, Switzerland

[21] Appl. No.: 801,418

[22] Filed: May 27, 1977

[30] Foreign Application Priority Data

Jun. 4, 1976 [CH] Switzerland .................. 7098/76

[51] Int. Cl.² .............................................. B01D 46/02
[52] U.S. Cl. ......................................... 55/381; 55/521; 55/DIG. 5; 29/157 R
[58] Field of Search .................. 55/381, 382, 483, 500, 55/521, DIG. 5, DIG. 12; 210/486, 541, 497; 29/157 R

[56] References Cited
U.S. PATENT DOCUMENTS

| 2,853,154 | 9/1958 | Rivers | 55/376 |
| 3,160,908 | 12/1964 | Peabody et al. | 55/381 |
| 3,273,321 | 9/1966 | Bauder et al. | 55/382 |
| 3,400,519 | 9/1968 | Korn et al. | 55/499 |
| 4,056,375 | 11/1977 | Ringil et al. | 55/381 |

OTHER PUBLICATIONS

Deutsches Gebrauchmuster, 7529340 dated Feb. 19, 1976, pp. 1-9.

Primary Examiner—Bernard Nozick
Attorney, Agent, or Firm—Werner W. Kleeman

[57] ABSTRACT

A gas filter element and method of manufacturing the same, wherein the gas filter element is equipped with a substantially wedge-shaped filter pocket containing side walls composed of filter material and a number of areal spacer holders dispositioned in the pocket and extending transversely to the side walls approximately in the direction of flow of the gas. The spacer holders or spacers are connected along lengthwise edges thereof with the side walls. These spacer holders form oppositely situated sides of a tetrahedrally formed hose section composed of course mesh material.

13 Claims, 2 Drawing Figures

GAS FILTER ELEMENT AND METHOD OF MANUFACTURING THE SAME

BACKGROUND OF THE INVENTION

The present invention relates to a new and improved construction of gas filter element for gas cleaning, which is of the type comprising a substantially wedge-shaped filter pocket containing side walls formed of a filter material and a number of areal or surface-like flexible spacer holders, which may be of a given geometric configuration, such as triangular- or trapezoidal-shaped, arranged to extend approximately in the direction of gas flow transverse to the side walls and are connected along lengthwise edges thereof with the side walls. The invention also is concerned with a method of manufacturing the gas filter elements of the invention.

Gas filter elements of this general type usually possess spacer holders composed of blanks. According to one of the prior art gas filter elements the spacer holders are designed as double-wall trapezoidal blanks and are connected with the pocket walls by an adhesive bond or welding.

Particularly as concerns the fabrication of the spacer holders or spacers, the state-of-the-art gas filter elements are not totally satisfactory. In order to produce the blanks, for instance in a trapezoidal-shaped configuration, there are required correspondingly expensive cutting devices if there is to be realized any rational production.

If the spacer holders are to be structured as double-wall elements, then an additional operation and expenditure is needed for welding or heat sealing the blanks, increasing the manufacturing costs.

SUMMARY OF THE INVENTION

Hence, with the foregoing in mind it is a primary object of the present invention to provide a new and improved construction of gas filter element which is not associated with the aforementioned drawbacks and limitations of the prior art proposals.

Another and more specific object of the present invention aims at the provision of a novel construction of gas filter element which can be manufactured in a relatively simple manner and at lesser costs.

Still a further significant object of the present invention aims at a novel method of producing a gas filter element in an extremely simple, reliable, efficient and economical manner.

Now in order to implement these and still further objects of the invention, which will become more readily apparent as the description proceeds, the gas filter element of this development is manifested by the features that each of the spacer holders form in pairs sides of tetrahedral shaped hose sections which are formed of course mesh material.

The hose sections can be obtained by simply cutting them to size from, for instance, an endless fabricated circular material in the form of a mesh or net fabric. In this way, it is possible to considerably reduce the manufacturing costs of the spacer holders or spacers, especially since each hose section is formed into a pair of spacer holders.

Not only is the invention concerned with the aforementioned gas filter element, but deals with a novel method of fabricating the same. According to the method aspects of this development there is provided a substantially wedge-shaped filter pocket having side walls formed of a filter material. A hose section composed of course mesh material is shaped into substantially tetrahedral configuration to form a spacer element, and such spacer element is attached at opposite sides thereof to opposite side walls of the filter pocket. The tetrahedral-shaped spacer holder is dispositioned transversely in the filter pocket with respect to the side walls thereof.

It will be appreciated that the sides of the tetrahedral-shaped spacer holder which are attached to the side walls of the filter pocket partially cover the inner surface of the pocket side walls and the greatest width of the sides of the tetrahedral-shaped spacer holder connected with the side walls of the pocket is dispositioned at that location of the pocket where the velocity of gas flow increases, so that a good firm connection is present especially at that location where detachment between the spacer holder and the side walls of the pocket would be most likely.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
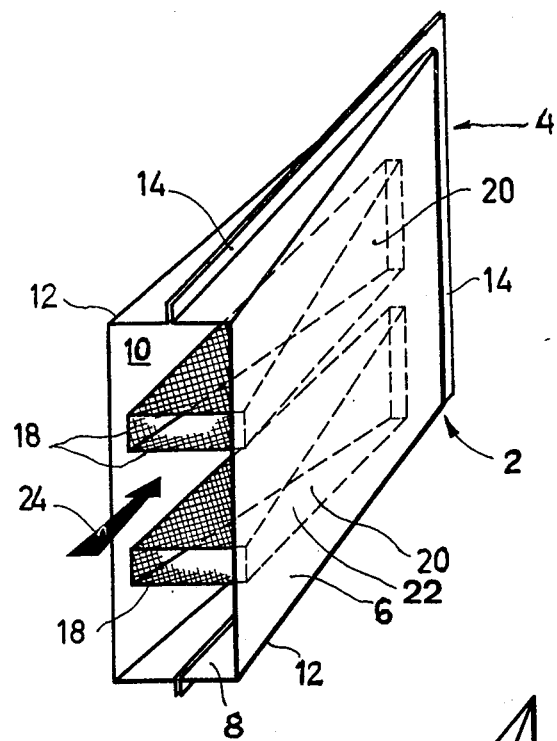
FIG. 1 is a perspective view of a gas filter element produced according to the present invention.

Describing now the drawings, the gas filter element of the invention, shown by way of example in FIG. 1, has been generally designated by reference character 2 and possesses a filter pocket 4 which is of substantially wedge-shape in longitudinal section, as shown, and the substantially rectangular side walls of which have been designated by reference character 6 and the side walls which form its acute-angle triangles have been generally designated by reference character 8. The filter pocket 4, which possesses an open end 10 at which there enters the gas flow, is composed of two blanks 12 formed of a suitable filter material, such as a filter mat, these blanks 12 being directed towards one another at their dust-laden air sides. The blanks 12 are interconnected by means of a welding seam 14 which extends around up to the open end or side 10 of the filter pocket 4.

The rectangular-shaped side walls 6 of the filter pocket 4 are interconnected with one another by spacer holders or spacers 18 extending between the side walls 8 which are formed in pairs by oppositely situated sides or side surfaces, respectively, of tetrahedrons or as illustrated, truncated tetrahedrons 20. Both of the other sides 22 of each truncated tetrahedron 20 define side faces which are flatly connected with the inner surfaces of the confronting side walls 6 or at least connected along the edges by welding or an adhesive bond.

Figure 2:
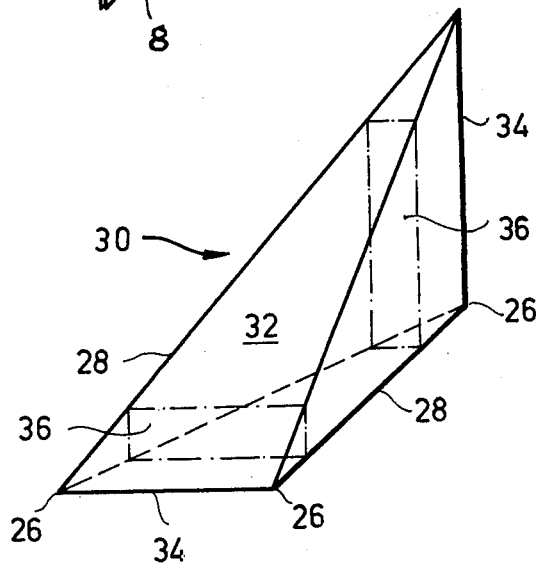
FIG. 2 likewise shows in perspective view a tetrahedral formed of a hose section and which can be beneficially used as a spacer holder for the gas filter element of the arrangement of FIG. 1.

The truncated tetrahedrons 20 are formed of sections of a hose or a net-like or mesh structure or fabric. If a hose section is pressed flat at both of its opposite ends, and specifically, as illustrated in FIG. 2, offset in the peripheral direction through 90°, and if there are interconnected the corners 26 formed at oppositely situated ends by the bending folds 28, then there is formed a tetrahedron 30. The four side surfaces defining 32 defining first and second pair of opposite side surfaces, which are produced by shaping or forming the hose section constitute isosceles triangles. The base of each triangle is located at one of both cut edges 34 of the hose section and possesses a length corresponding to one-half of the hose periphery. The height of the triangular surface above the base corresponds to the length of the hose section.

If during shaping or forming of the hose section both of the ends are only partially squeezed together (which for the showing of FIG. 2 would be equatable to a length of the hose section corresponding to the spacing between both of the chain-dot indicated cutting planes 36), then there would be formed the bodies or body members 20 illustrated in the exemplary embodiment of FIG. 1 and designated as truncated tetrahedrons. It will be apparent that thus the parts of the triangular side surfaces 32 (of the tetrahedron 30 of FIG. 2) disposed between the cutting planes 36 correspond to the trapezoidal-shaped sides 18 and 22, respectively, of the truncated tetrahedron 20. By virtue of the course mesh of the net-like material from which there are formed the truncated tetrahedrons 20, the filter mat portions at the inner surface of the side walls 6, which are covered by the sides 22, remain completely effective as filter means. On the other hand, the net-like material in certain instances functions as a desirable reinforcement or protection of the filter mat against release of fibers therefrom under the action of the air current.

Due to the flexible character of the spacer holders or spacers 18, which prevent any bowing-out of the filter pocket under the action of the dust-laden air which flows in through the open end or side 10 in the direction of the arrow 24, there is possible a folding together of the pockets for the transport of the gas filter elements. The truncated tetrahedrons are open at their ends or end faces.

While there are shown and described present preferred embodiments of the invention, it is to be distinctly understood that the invention is not limited thereto, but may be otherwise variously embodied and practiced within the scope of the following claims.

What I claim is:

1. A method of manufacturing a gas filter element, comprising the steps of:
   providing a substantially wedge-shaped filter pocket having side walls formed of filter material;
   forming a hose section composed of mesh material into a substantially tetrahedral configuration to form a spacer element having a substantially constant perimeter throughout the lengthwise extent thereof; and
   attaching outer side walls of said spacer element which are coplanar to and in confronting relationship to opposite surfaces of inner side walls of the filter pocket at opposed edges of the outer side walls of the spacer element;
   whereby the side walls of the filter pocket are reinforced and prevented from bowing in and out.

2. The method as defined in claim 1, wherein:
   said tetrahedral-shaped spacer holder is dispositioned substantially transversely in the filter pocket with respect to the side walls thereof.

3. The method as defined in claim 1, wherein:
   said tetrahedral-shaped spacer holder has side walls confronting the side walls of the filter pocket, partially covering such filter pocket-side walls and at least partially connected therewith.

4. The method as defined in claim 3, wherein:
   said confronting side walls of the tetrahedral-shaped spacer holder have diverging edges such that the greatest width of each such side wall of the tetrahedral-shaped spacer holder is located in the filter pocket downstream with respect to the direction of gas flow into the filter pocket.

5. A gas filter element for cleaning gases moving in a predetermined direction of gas flow, comprising:
   means defining a substantially wedge-shaped filter pocket having side walls composed of filter material;
   a number of flexible spacer holders;
   each of said spacer holders comprising a substantially tetrahedrally formed hose section composed of coarse mesh material;
   said spacer holders being arranged in said filter pocket transversely with respect to the side walls thereof and extending in the direction of flow of the gases to be cleaned;
   each of said spacer holders constituting a body having an essentially constant perimeter throughout the lengthwise extent thereof;
   each of said spacer holders having a first pair of opposite sides and a second pair of opposite sides;
   the outer sides of said first pair of opposite sides defining side faces of the spacer holder which extend substantially coplanar with and adjacent a confronting opposite surface of an inner side wall of said pocket;
   each of said side faces of said first pair of opposite sides of each spacer holder having lengthwise edges extending in the direction of flow of the gases to be cleaned; and
   said spacer holders being connected along at least each of said lengthwise edges of each of said side faces of said first pair of opposite sides with the confronting side wall of said pocket, to thereby reinforce said side walls of said filter pocket and to also at least minimize the tendency of outward deformation of said side walls of said filter pocket due to the pressure of the gases to be cleaned.

6. The gas filter element as defined in claim 5, wherein:
   said hose section comprises a net-like fabric.

7. The gas filter element as defined in claim 5, wherein:
   each of the spacer holders has opposite ends spaced from one another in the direction of flow of the gases to be cleaned;
   each of said opposite ends having a maximum lengthwise extent of essentially the same dimension.

8. The gas filter element as defined in claim 5, wherein:
   each of said spacer holders is formed of a material which essentially does not exert any filtering action.

9. The gas filter element as defined in claim 5, wherein:
   each of said spacer holder elements has opposite ends spaced from one another in the direction of flow of the gases to be cleaned;
   said opposite ends each being open.

10. The gas filter element as defined in claim 9, wherein:

each of said spacer holders possesses an essentially identical configuration.

11. The gas filter element as defined in claim 9, wherein:
the area of both opposite ends of each spacer holder is essentially the same.

12. The gas filter element as defined in claim 5, wherein:
each of said side faces of said first pair of opposite sides partially cover the inner surfaces of the respective confronting side wall of the filter pocket.

13. The gas filter element as defined in claim 12, wherein:
each of said side faces are flatly connected with said side walls of the filter pocket.

* * * * *